United States Patent Office 3,060,199
Patented Oct. 23, 1962

3,060,199
PREPARATION OF 21-ACYLOXY-17α-HYDROXY-16β - METHYL - PREGNA - 1,4,9 - TRIENE - 3,20-DIONE FROM THE CORRESPONDING 2,4 DIBROMO DERIVATIVE
Alan Gibson Long, Greenford, Stephen Eardley, Ruislip, and George Francis Harold Green, Harefield, England, assignors to Glaxo Laboratories Limited, Greenford, England, a British company
No Drawing. Filed Nov. 25, 1960, Ser. No. 71,408
Claims priority, application Great Britain Nov. 26, 1959
6 Claims. (Cl. 260—357.45)

This invention is concerned with improvements in or relating to the preparation of steroid compounds, particularly steroid compounds having a 16-methyl substituent.

Various steroid compounds having methyl groups in the 16-position have recently become of interest particularly in the field of anti-inflammatory steroids, it having appeared that the presence of a 16-methyl substituent may markedly affect physiological properties. It has thus become of importance to devise means for preparing compounds of the steroid series, and particularly of the anti-inflammatory series, having 16-methyl substituents.

It is thus an object of this invention to provide an improved method of obtaining certain 16-methyl steroids having double bonds in the 1,4-positions and a keto group in the 3-position characteristic of many anti-inflammatory compounds.

In application No. 24,895/59 there is described the preparation of 21-acyloxy-17α-hydroxy-16β-methyl-5α-pregn-9-ene-3,20-dione compounds. We have now found that these compounds can be dibrominated to yield hitherto undescribed 21 - acyloxy - 2,4-dibromo-17α-hydroxy-16β-methyl-5α-pregn-9-ene-3,20-dione compounds which latter can be readily dehydrobrominated to yield the desired $\Delta^{1,4}$-3-ketone. The $\Delta^{1,4}$-3-ketone may in turn be converted to a pharmacologically active compound, e.g. 16β-methyl-9α-fluoro - prednisolone, by epoxidation (in two stages) of the 9(11)-double bond followed by reaction with hydrogen fluoride.

The bromination of 21-acyloxy-17α-hydroxy-16β-methyl-5α-pregn-9-ene-3,20-dione compounds may be effected in any convenient way e.g. by dibrominating with molecular bromine in a suitable organic solvent preferably in the presence of added hydrogen bromide. Thus, for example, one may use tetrahydrofuran, chloroform, dioxan, acetic acid and mixtures of dioxan and acetic acid as the reaction medium. Hydrogen bromide or other suitable acid e.g. p-toluene sulphonic acid may be added to initiate and catalyse the reaction. The bromination may be carried out at a temperature between −15° and +45° C., advantageously at room temperature. The reaction may be followed polarimetrically, the rotation rapidly reaching a peak corresponding to the 2,2-dibromo compound and then falling away to a steady value as re-arrangement to the 2,4-dibromo compound occurs. On completion of the desired reaction, the reaction mixture is preferably quenched, e.g. by rapid neutralisation, to avoid undesirable side-reactions ensuing.

According to the conditions of dibromination, the 2,4-dibromo compound obtained may consist of a single stereoisomer although more usually a mixture of stereoisomers results. Thus bromination in a mixture of glacial acetic acid and dioxan gives a mixture containing the 2α,4α- and 2α,4β-dibromo isomers. Where a mixture of isomers is obtained it may be fractionally crystallised into its component isomers if so desired.

If an isolated 2,4-dibromo isomer is used for dehydrobromination the overall yield may be improved by hydrogenolysing the residual 2,4-dibromo content of the mother liquors back to the parent 3-keto compound. For example, when using a mixture of glacial acetic acid and dioxan one can crystallise a first fraction consisting substantially of the 2α,4α-dibromo isomer and use this for dehydrobromination. The remaining 2,4-dibromo content of the mother liquors may then be converted to the parent 3-ketone by hydrogenolysis and recycled. However, since the 2α,4β-dibromo isomer gives good yields on dehydrobromination it may be desirable to reverse the procedure, i.e. recover the 2α,4β-isomer from the mother liquor, or a mixture containing a high proportion of the isomer, hydrogenolyse the 2a,4a-isomer to the parent ketone and recycle i.e. dibrominate the ketone, fractionate and so on.

The 2,4-dibromo compound (either as a mixture of isomers or as a pure isomer) is then dehydrobrominated to the corresponding $\Delta^{1,4}$-3-ketone. We have found that this can advantageously be achieved by means of certain inert Lewis bases.

According to the invention, therefore, there is provided a process for the production of a 21-acyloxy-17α-hydroxy - 16β - methyl - pregna - 1,4,9 - triene - 3,20 - dione which comprises dehydrobrominating a 21-acyloxy-2,4-dibromo - 17α - hydroxy - 16β - methyl - 5α - pregn - 9-ene-3,20-dione by heating in the presence of a dehydrobrominating agent comprising an inert Lewis base containing a tertiary nitrogen atom and having a high dielectric constant, i.e. above 15, said base being liquid at the temperature of dehydrobromination. The dielectric constant of the base is advantageously within the range of 30–40.

Bases which are preferred for the purpose of the invention are those containing one of the following groups:

(a) 

(b) 

Bases of high dielectric constant and suitable for the process of this invention may be chosen from the group of substituted amides of the general formula $$R^1—CO.NR^2.R^3$$

where $R^1$ is a hydrogen atom or an alkyl group containing 1 to 5 carbon atoms and $R^2$ and $R^3$, which may be the same or different, are each an alkyl group containing 1 to 5 carbon atoms, or, alternatively $R^2$ and $R^3$ together form a divalent aliphatic group which, together with the adjacent nitrogen atom, forms a heterocyclic ring. Examples of amides of this type are N,N-dimethylformamide, N,N-diethylformamide, N:N-dipropylformamide, N,N-dibutylformanide, N,N-dimethylacetamide, N,N-diethylacetamide, N,N-dimethylvaleramide, N,N-dimethylpropionamide, N-formylpiperidine and N-formylmorpholine. Of this group of compounds, we prefer to use N,N-dimethylacetamide.

Another convenient group of bases are substituted diamides of the general formula $$R^2.R^3NCO.(CH_2)_nCO.NR^2.R^3$$

where $R^2$ and $R^3$ have the significance defined above and $n$ is an integer from 1–5. Such compounds include for example N,N,N',N'-tetramethylsuccinamide and N,N,N', N'-tetramethyladipamide.

Another convenient group of tertiary bases are the N,N-dialkylcyanamides, e.g. N,N-dimethylcyanamide.

Yet another group of bases are tetraalkylureas of the general formula $R^2.R^3N.CONR^2.R^3$ where $R^2$ and $R^3$ have the meanings defined above. Examples of such substituted ureas include N,N,N',N'-tetramethylurea and N,N,N',N'-tetraethylurea.

The process according to the invention is preferably carried out in the presence of an inorganic basic substance which is inert to the steroid reactant and the desired steroid end-product. The function of the inorganic basic substance is apparently to act as a binding agent for the hydrogen bromide, produced during the reaction. Various inorganic basic substances may be used for this purpose with the obvious limitation that they must, of course, be inert to the steroid starting material and end-products under the conditions of the reaction.

In organic basic substances which are suitable include carbonates, e.g. lithium carbonate, calcium carbonate, strontium carbonate and barium carbonate. Preferably the inorganic basic substance is in finely powdered form, advantageously of a particle size less than 10 microns.

In addition to the inorganic basic substance, there may also be present in the reaction mixture an added alkali metal or alkaline earth metal halide, particularly a bromide, soluble in the reaction mixture, for example, lithium bromide, sodium bromide or calcium bromide. The presence of such a halide frequently enables the reaction to be carried out at lower temperatures and may result in an increased yield. Moreover the halide enables one to decrease the time of reaction at lower temperatures.

The time of reaction required to effect dehydrobromination of any specific steroid will depend on the temperature employed and a suitable balance of these factors may be readily determined by experiment. This may be conveniently done by heating the steroid in the chosen organic base with or without added inorganic basic substance or halide. The reaction mixture should then be maintained at a fixed temperature, and aliquots removed at intervals. The progress of the reaction can be measured by observing a suitable physical characteristic e.g. U.V. absorption. A graph plotted on such a basis will indicate clearly the minimum time required. Analysis of the product for bromine content is also helpful.

The dehydrobromination can conveniently be effected by heating at temperatures varying from 80 to 180° C. in the presence of the base and preferably the inorganic basic substance. When operating at temperatures in the lower region of the scale e.g. from 80 to 135° C. it is particularly desirable to have an alkali metal- or alkaline earth metal halide present in order to reduce the time required for the reaction and to give increased yield of the $\Delta^{1,4}$-3-ketone; such conditions represent the preferred method of operation.

When operating at higher temperatures e.g. 135–180° it may be convenient to carry out the reaction at the boiling point of the mixture. Operation at these higher temperatures may result in significant damage to the 17-side chain and so necessitate a rather tedious purification in order that the desired $\Delta^{1,4}$-3-ketone may be isolated. In view of this loss the yield may be relatively low, e.g. of the order of 40% for the mixture of isomers and about 46% for the crystalline $2\alpha,4\alpha$-isomer. The speed of the reaction at higher temperatures may be increased by the use of an alkali metal or alkaline earth metal halide, e.g. lithium bromide, but this may result in the optimum reaction time becoming inconveniently short.

When operating at lower temperatures, the 2,4-dibromo-steroid may be added to a stirred mixture of base, inorganic basic substance and alkali metal halide or alkaline earth metal halide and maintained at the reaction temperature until the U.V. spectrum and bromine content of an isolated sample show the reaction to be substantially complete. At 100° for example the time required may be about 20 hours for the crystalline $2\alpha,4\alpha$-isomer (as 21-acetate) and rather more for the mixture of isomers. Although the time of reaction is considerably longer than that required by using higher temperatures, there is little attack on the 17-side chain and the product is cleaner and correspondingly easier to purify.

Furthermore, the yield is higher, e.g. about 65% for the crystalline $2\alpha,4\alpha$-isomer and about 45% for the mixture of isomers.

We have found that generally best results are obtained by using calcium carbonate as the inorganic basic substance. For example in the low temperature method using lithium carbonate in place of calcium carbonate the product contained, in addition to the $\Delta^{1,4}$-3-ketone, 20–25% of the $\Delta^{4,6}$-3-ketone as judged by the U.V. spectra.

In order that the invention may be well understood the following examples are given by way of illustration only. In the examples the compounds for bromination were divided fine enough to pass a 100 mesh sieve.

Side-chain determinations were made with cortisone acetate as the reference. They are adjusted for the differences in molecular weight. The method has been described by Mader and Buck (Analyt. Chem., 1952, 24, 666). The homogeneity of the products was also tested by paper chromatography and infra-red spectroscopy.

EXAMPLE 1

*21-Acetoxy-2α,4α-Dibromo-17α-Hydroxy-16β-Methyl 5α-Pregn-9-Ene-3,20-Dione*

21 - acetoxy - 17α - hydroxy - 16β - methyl - 5α - pregn-9-ene-3,20-dione (5 g.) was suspended in a briskly stirred purified dioxan (125 ml.). A solution of hydrogen bromide in acetic acid (0.6 N, 4.5 ml.) was added, then bromine in acetic acid (0.920 M, 28.4 ml., 2.1 mol. eq.) in 3 mins. After a total reaction time of 20 mins. the solution was poured into water (2.5 litres) containing hydrated sodium acetate (25 g.). The white precipitate was collected and dissolved, without drying, in ether (500 ml.); the solution was washed with sodium bicarbonate solution dried (MgSO$_4$) and the ether was evaporated off in vacuo. The crude product crystallised from ethyl acetate (65 ml.) and n-hexane (270 ml.) to afford white microcrystals of the dibromo compound (3.12 g., 45%), M.P. 196–198° (decomp.), $[\alpha]_D^{24}$ +43° (c., 0.9 in chloroform). (Found: Br, 28.1. $C_{24}H_{32}O_5Br_2$ requires Br, 28.5%).

The mother liquor was evaporated to dryness in vacuo and the residue dissolved in acetic acid (40 ml.) and ethyl acetate (40 ml.). Together with N-potassium acetate (dried) in acetic acid (22 ml.), this was added to a pre-reduced suspension of 5% palladium on charcoal catalyst (500 mg.) in acetic acid (12.5 ml.) and ethyl acetate (12.5 ml.). The whole was hydrogenated at 23.5°/ 760 mm.; about 2 mol. eq. of hydrogen were absorbed in 120 min., when absorption ceased. The isolated product yielded, from acetone, white microplates of 21-acetoxy - 17α - hydroxy - 16β - methyl - 5α - pregn - 9 - ene-3,20-dione (1.53 g.), M.P. 183–189° C. $[\alpha]_D^{23}$ +84°.

EXAMPLE 2

*21-Acetoxy-2α,4β-Dibromo-17α-Hydroxy-16β-Methyl-5α-Pregn-9-Ene-3,20-Dione*

In an experiment carried out as in Example 1, evaporation of the mother liquors from the crystallisation of the $2\alpha$-$4\alpha$-dibromo-compound yielded material with a low rotation. Three crystallisations from ether then gave white needles, M.P. 120–126°, $[\alpha]_D^{25}$ −22° (c., 0.7; chloroform). (Found: Br, 26.5% of the compound named in the title.)

DEHYDROBROMINATION OF 21-ACETOXY-2α,4α-DIBROMO-17α-HYDROXY-16β-METHYL-5α-PREGN-9-ENE - 3,20-DIONE

EXAMPLE 3

*With Calcium Carbonate and Lithium Bromide in Dimethylacetamide at 95°*

A tabletted mixture of the above dibromo-compound (5 g.) and calcium carbonate (5 g.) was added to a vigorously stirred suspension of calcium carbonate (2 g.)

and lithium bromide (2.3 g.) in dimethylacetamide (62.5 ml.) at 95° under nitrogen. The mixture was stirred at 95° for 22 hours, cooled, and poured, with rapid stirring, into iced N-hydrochloric acid (1 litre). After being stirred for 30 minutes the product was filtered off, washed successively with water, dilute sodium bicarbonate solution and to neutrality with water, then dried at 100° in vacuo. The crude product weighed 3.315 g. (93%). Part of the product (3.258 g.) in benzene (110 ml.) was chromatographed on a column of charcoal (7.2 g., 15″ x ½″). Benzene (1 litre) eluted a white solid (2.989 g.), which was recrystallised from acetone (25 ml.). The first crop (1.804 g., 50.6%) had M.P. (Kofler) 218–224°, $\lambda$ max. 238 m$\mu$ (E$_{1cm.}^{1\%}$ 405)

[$\alpha$]$_D$ +69° (c., 0.58: dioxan). (Found: side chain 90%.) The second crop (0.355 g., 10.0%) had M.P. (Kofler) 215–223°, $\lambda$ max. 238 m$\mu$ (E$_{1cm.}^{1\%}$ 412)

[$\alpha$]$_D$ +69° (c., 1.29: dioxan).

EXAMPLE 4

With Calcium Carbonate in Refluxing Dimethylacetamide

A mixture of the 2$\alpha$-4$\alpha$-dibromide (5 g.), and calcium carbonate (4 g.) was added to a stirred and refluxing suspension of calcium carbonate (1.5 g.) in dimethylacetamide (40 ml.) under a nitrogen atmosphere. Refluxing was continued for 20 minutes, the reaction mixture was cooled and poured, with rapid stirring into ice-cold 5 N hydrochloric acid (500 ml.). Isolation in the manner described in Example 3 yielded a crude product (3.333 g.), $\lambda$ max. 239 m$\mu$ (E$_{1cm.}^{1\%}$ 363)

(Found: Br, 1.6%: side-chain 87%). Part of this product (3.27 g.) in ethanol (90 ml.) and acetic acid (5.4 ml.) was refluxed with Girard P reagent for 15 minutes, the solution concentrated to about half volume in vacuo, and poured into 4% sodium bicarbonate solution; the unreacted material was extracted into ethyl acetate (50 ml. x 8), the combined extracts washed with sodium bicarbonate solution and water, dried (over MgSO$_4$), and the solvent evaporated. The resulting foam (2.980 g.) had $\lambda$ max. 238 m$\mu$ (E$_{1cm.}^{1\%}$ 398)

it was dissolved in boiling benzene, cooled and filtered from a small amount of insoluble residue (0.094 g.). The filtrate was chromatographed on a column of charcoal (4 g.). Elution with benzene and benzene-ethyl acetate (9:1) yielded a white solid (2.495 g.), $\lambda$ max. 238 m$\mu$ (E$_{1cm.}^{1\%}$ 366)

Recrystallisation from acetone gave the required 16$\beta$-methyl-triene (1.632 g., 46%) in 3 crops.

PREPARATION OF 21-ACETOXY - 17$\alpha$ - HYDROXY-16$\beta$-METHYL - 5$\alpha$ - PREGN-1,4,9-TRIENE-3,20-DIONE WITHOUT PURIFICATION OF THE DIBROMO-COMPOUND

EXAMPLE 5

Dehydrobromination with Calcium Carbonate in Refluxing Dimethylacetamide

To a rapidly stirred suspension of 21-acetoxy-17$\alpha$-hydroxy - 16$\beta$ - methyl - 15$\alpha$ - pregn - 9 - ene - 3,20 - dione (5 g.) acetic acid (100 ml.) was added 6.59 N-hydrogen bromide in acetic acid (0.35 ml.). 2.49 N-bromine in acetic acid (20 ml.) (2 mol. equivs.) was then added over 3.5 mins. and total solution of the steroid occurred after addition of ca. 1.5 mole equiv. The rotation of the solution fell during the next 25 mins. but reached a constant value after a total reaction period of 30 mins. (c.$_D$=+4.19°, 2-dm. tube). The solution was poured into 15% sodium acetate solution (1 litre) and the precipitated dibromosteroid filtered, washed well with water and dried (6.8 g.)

Dehydrobromination, as in Example 4, with calcium carbonate (10 g.) in refluxing dimethylacetamide (50 ml.) for 30 mins. gave the crude 16$\beta$-methyl trienone acetate (4.95 g.)

$\lambda$ max. 237 m$\mu$ (E$_{1cm.}^{1\%}$ 376)

This material after treatment with Girard P reagent (see Example 4) and removal of a benzene-insoluble material (0.589 g.) gave by chromatography on charcoal (30 g.) a crude material that yielded by crystallisation from acetone the required 16$\beta$-methyl-triene (2.235 g.) in 5 crops.

Infra-red spectra of the 4th and 5th crops revealed traces of an impurity, $\lambda$ max. 1800 cm.$^{-1}$, thought to be an oxide (17,21-oxide ?); otherwise they all resembled the standard.

The initial bromination may also be undertaken with dioxan or a mixture of dioxan and acetic acid (see Examples 1 and 6) as solvent.

EXAMPLE 6

21 - acetoxy - 17$\alpha$-hydroxy-16$\beta$-methyl-5$\alpha$-pregn-9-ene-3,20-dione, (5 g.) suspended in glacial acetic acid (62.5 ml.) and pure dioxan (62.5 ml.) was treated with 0.6 N-hydrogen bromide in acetic acid (2.5 ml.) and the mixture rapidly stirred. A solution of 2.3 N-bromine in acetic acid (22.64 ml., 2.1 mol. equiv.) was then added over a period of 3 mins., during which time the steroid dissolved. The resulting straw-coloured solution was stirred for 15 mins., making a total reaction period of 18 mins. It was then poured into an ice-cooled solution of sodium acetate (25 g.) in water (2.5 litres) with vigorous stirring and the stirring continued for 5 mins. The precipitate was filtered and washed with water, and then extracted immediately into methylene chloride (200 ml.) from which, after suitable washings, the dibromo steroid (7.386 g.) was obtained by evaporation. This solid was intimately mixed with calcium carbonate (6.96 g.) and added to a stirred mixture of lithium bromide (3.2 g.) and calcium carbonate (2.8 g.) in dimethylacetamide (87 ml.) maintained at 95° under nitrogen. The reaction mixture was stirred at this temperature for 34 hours. Isolation of the steroid gave after chromatography and the Girard separation (see Example 4) a yellow solid (3.915 g.)

$\lambda$ max. 238 m$\mu$ (E$_{1cm.}^{1\%}$=375)

This solid in benzene (100 ml.) was passed through a charcoal column (unground charcoal) (2 g.) and eluted with benzene (500 ml.). Removal of the benzene gave a cream solid (3.84 g.) that was crystallised from acetone to give 21-acetoxy-17$\alpha$-hydroxy-16$\beta$-methyl-5$\alpha$-pregna-1,4,9-triene-3,20-dione (2.840 g.) in 3 crops.

EXAMPLE 7

Dehydrobromination of 21-Acetoxy-2$\alpha$,4$\beta$-Dibromo-17$\alpha$-Hydroxy-16$\beta$-Methyl-5$\alpha$-Pregn-9-ene-3,20-Dione 21 - acetoxy - 2$\alpha$,4$\beta$-dibromo-17$\alpha$-hydroxy-16$\beta$-methyl-5$\alpha$-pregn-9-ene-3,20-dione (1 g.) intimately mixed with calcium carbonate (1 g.) was added to a stirred mixture of lithium bromide (0.46 g.) and calcium carbonate (0.4 g.) in dimethylacetamide (12 ml.) maintained at 95° under nitrogen. The reaction mixture was stirred at this temperature for 22 hrs. and then cooled and poured into ice-cold N-hydrochloric acid (250 ml.) with vigorous stirring. The white precipitate was filtered off, washed and dried (0.646 g., 91%) M.P. (Kofler) 224–227°, M.P. (cap.) 206–210

$\lambda$ max. 238 m$\mu$ (E$_{1cm.}^{1\%}$ 398)

(Found: side-chain 96%).

Crystallisation of part (0.598 g.) from acetone gave the pure 16$\beta$-methyl-triene (0.405 g.) in 2 crops.

EXAMPLE 8

The Use of Toluene-p-Sulphonic Acid As Catalyst for the Bromination of 21-Acetoxy-17$\alpha$-Hydroxy-16$\beta$-Methyl-5$\alpha$-Pregn-9-ene-3,20-Dione 21 - acetoxy - 17$\alpha$-hydroxy-16$\beta$-methyl-5$\alpha$-pregn-9-ene- 3,20-dione (20 g.) was suspended in glacial acetic acid (400 ml.) containing toluene-p-sulphonic acid (0.86 g.). A solution of bromine in acetic acid (2.79 N, 73 ml., 2.05 mol. eq.) was added in 5 minutes. After a total reaction time of 17.5 minutes, the solution was poured into water (2.0 litres) containing hydrated sodium acetate (37 g.). The solid was taken up in methylene chloride (200 ml.), the layers separated and the aqueous phase re-extracted with methylene chloride (2 x 200 ml.).

After suitable washings of the methylene chloride solutions the dibromosteroid was isolated as a gum by evaporation under reduced pressure. The gum was dissolved in dimethylacetamide (30 ml.) and the last traces of methylene chloride were removed by distillation under reduced pressure at room temperature. The resulting solution was added to a refluxing stirred suspension of calcium carbonate (30 g.) in dimethylacetamide (200 ml.) and reacted as described in Example 4 to give a crude product (16.0 g.)

$\lambda$ max. 238.5 m$\mu$ ($E_{1\,cm.}^{1\%}$ 374)

This crude product in methanol (300 ml.) and acetic acid (15 ml.) was treated with Girard reagent P (5.0 g.) by boiling under reflux for 15 minutes. The cooled reaction mixture was poured into 4% aqueous sodium bicarbonate solution and the product isolated as described in Example 4, including the chromatography on charcoal (60 g.) and a final crystallisation from acetone. The product (8.87 g., 44%), isolated in one crop, showed M.P. (cap.) 205–206°

$\lambda$ max. 238 m$\mu$ ($E_{1\,cm.}^{1\%}$ 395)

EXAMPLE 9

*Dehydrobromination of Mixed Di-Bromo-Isomers at 130° C.*

Crude dibromo-compound, prepared as in Example 5 from 21-acetoxy-17$\alpha$-hydroxy-16$\beta$-methyl-5$\alpha$-pregn-9-ene-3,20-dione (20 g.), in solution in dimethylacetamide (70 ml.) was added at room temperature under nitrogen to a stirred mixture of calcium carbonate (40 g.) and lithium bromide (6.5 g.) in dimethylacetamide (100 ml.). The temperature of the reaction mixture was raised during 80 mins. to 130°, and after 3 hrs. at 130° the reaction mixture was cooled and poured into iced N-hydrochloric acid (1700 ml.) with stirring. After stirring for 30 mins. the precipitated crude trienone (19.12 g.) was collected by filtration, washed with dilute hydrochloric acid, water, aqueous sodium hydrogen carbonate and water, and dried over phosphorus pentoxide.

Part (18.0 g.) of the crude trienone was boiled under reflux for 1 hour with Girard reagent P (4.5 g.) in methanol (300 ml.) and acetic acid (15 ml.). The solution was cooled and poured into a stirred mixture of aqueous sodium hydrogen carbonate (4%; 2 litres) and ethyl acetate (300 ml.). The ethyl acetate layer was separated and the aqueous layer was extracted with more ethyl acetate (3 x 200 ml.), and the combined ethyl acetate extracts were washed with aqueous 4% sodium hydrogen carbonate solution (2 x 100 ml.) and water (2 x 100 ml.). Evaporation of the dried extract to dryness in vacuo left crude solid trienone (13.7 g.), $\lambda$ max. (in EtOH) 238 m$\mu$, $E_{1\,cm.}^{1\%}$ 363

The solid (13.6 g.) in solution in ethyl acetate (400 ml.) was stirred for 3 hrs. at room temperature with charcoal (7.0 g.). The charcoal was removed by filtration and extracted with more ethyl acetate. Concentration of the ethyl acetate filtrates gave the trienone in three crops. The first crop (6.86 g.) had M.P. 213.5–219° (cap.), [$\alpha$]$_D$+70° (c., 1.17 in dioxan), $\lambda$ max. (in EtOH) 238 m$\mu$ $E_{1\,cm.}^{1\%}$ 30 the second crop (2.27 g.), had M.P. 211–216°, [$\alpha$]$_D$+70.5° (c., 1.2 in dioxan), $\lambda$ max. (in EtOH) 238 m$\mu$, $E_{1\,cm.}^{1\%}$ 371 the third crop (0.81 g.) obtained after a second charcoal treatment, had M.P. 207–215°, [$\alpha$]$_D$+71.4° (c., 1.4 in dioxan), $\lambda$ max. (in EtOH) 238.5 m$\mu$ $E_{1\,cm.}^{1\%}$ 382

The total yield was 53%.

EXAMPLE 10

*Dehydrobromination of 21-Acetoxy-2$\alpha$,4$\alpha$-Dibromo-17$\alpha$-Hydroxy-16$\beta$-Methyl-5$\alpha$-Pregn-9-Ene-3,20-Dione at 130°*

Crystalline 21 - acetoxy - 2$\alpha$,4$\alpha$ - dibromo - 17$\alpha$ - hydroxy-16$\beta$-methyl-5$\alpha$-pregn-9-ene-3,20-dione (1.0 g.) was ground in a mortar with calcium carbonate (1.0 g.) and added under nitrogen to a stirred suspension of calcium carbonate (0.40 g.) and lithium bromide (0.46 g.), preheated to 130° C. After 4 hours at 130° the cooled reaction mixture was poured into iced N-hydrochloric acid (120 ml.) with stirring. After 30 mins. the crude trienone (659 mg.) was collected by filtration, washed with dilute hydrochloric acid, water, aqueous sodium hydrogen carbonate, and water. Crystallisation from ethyl acetate (with charcoal) gave the trienone in two crops. The first crop (47% yield) had M.P. 214–218° (cap.), [$\alpha$]$_D$+69° (c., 1.4 in dioxan), $\lambda$ max. (in EtOH) 238 m$\mu$, $E_{1\,cm.}^{1\%}$ 397 and the second crop (13%), had M.P. 211–215° (cap.), [$\alpha$]$_D$+68°, $\lambda$ max. (in EtOH) 239 m$\mu$, $E_{1\,cm.}^{1\%}$ 389

EXAMPLE 11

*Dehydrobromination in Presence of Calcium Bromide*

The procedure of Example 3 was repeated but with replacement of lithium bromide by an equimolar quantity of calcium bromide and this gave crude trienone with $\lambda$ max. (in EtOH) 238 m$\mu$, $E_{1\,cm.}^{1\%}$ 389

EXAMPLE 12

*Dehydrobromination in Presence of Sodium Bromide*

The procedure of Example 3 was repeated but with replacement of lithium bromide by an equimolar quantity of sodium bromide and this gave crude trienone with $\lambda$ max. (in EtOH) 238 m$\mu$, $E_{1\,cm.}^{1\%}$ 375

EXAMPLE 13

*Effect of Lithium Bromide Upon Speed of Dehydrobromination of 21-Acetoxy-2$\alpha$,4$\alpha$-Dibromo-17$\alpha$-Hydroxy-16$\beta$-Methyl-5$\alpha$-Pregn-9(11)-Ene-3,20-Dione*

In these experiments, the dibromo-compound (1 g.) was added to a stirred mixture of dimethylacetamide (12 ml.), calcium carbonate (1.40 g.) and, where stated, lithium bromide (0.46 g.); the mixture was preheated to the reaction temperature. The "reaction time" is that required to yield a crude product containing less than 1% of bromine.

| Temperature, degrees | Reaction time | |
|---|---|---|
| | Without lithium bromide | With lithium bromide |
| 100 | >24 hours [1] | 24 hours. |
| 115 | | 7 hours. |
| 130 | 6 hours | 4 hours. |
| 150 | | 30 mins. |
| 170 | 25 minutes | <10 mins. |

[1] Product, after 24 hours contained 3.9% bromine.

We claim:

1. A process for the production of 21-acyloxy-17$\alpha$-hydroxy - 16$\beta$ - methyl - pregna - 1,4,9 - triene - 3,20 - dione which comprises dehydrobrominating a 21-acyloxy-2,4-dibromo - 17$\alpha$ - hydroxy - 16$\beta$ - methyl - 5$\alpha$ - pregn - 9 - ene-3,20-dione by heating in the presence of an inorganic basic substance selected from the group consisting of calcium carbonate and lithium carbonate and a dehydrobrominating agent selected from the group consisting of a compound having the formula R'—CO.NR$^2$.R$^3$ in which R' is selected from the group consisting of hydrogen and alkyl of 1 to 5 carbon atoms and R$^2$ and R$^3$ are each alkyl of 1 to 5 carbon atoms and a compound having the formula R'—CO.X in which R' has the same meaning as above and X is selected from the group consisting of morpholino and piperidino.

2. A process as clamied in claim 1 in which said basic substance is calcium carbonate.

3. A process as claimed in claim 2 in which the inorganic basic substance has a particle size of less than 10 microns.

4. A process as claimed in claim 1 in which there is present in the reaction mixture, in addition to the inorganic basic substance, an inorganic halide selected from the group consisting of an alkali metal halide and an alkaline earth metal halide soluble in the reaction mixture.

5. A process as claimed in claim 4 in which said halide is selected from the group consisting of lithium bromide, sodium bromide and calcium bromide.

6. A process which comprises dibrominating in a mixture of dioxan and acetic acid at a temperature between 15° and +45° C., a 21-acyloxy-17α-hydroxy-16β-methyl-5α-pregn-9-ene-3,20-dione to form a 21-acyloxy-2,4 - dibromo-17α-hydroxy-16β-methyl-5α-pregn - 9 - ene - 3,20-dione and dehydrobrominating the latter in dimethylacetamide in the presence of calcuim carbonate to form a 21-acyloxy-17α-hydroxy-16β-methyl-pregna-1,4,9-triene-3,20-dione.

References Cited in the file of this patent
UNITED STATES PATENTS

| | | |
|---|---|---|
| 2,694,079 | Holysz et al. | Nov. 9, 1954 |
| 2,838,531 | Babcock et al. | June 10, 1958 |
| 2,888,472 | Muller et al. | May 26, 1959 |
| 2,945,029 | Nomine | July 12, 1960 |
| 2,980,713 | Chemerda et al. | Apr. 18, 1961 |